United States Patent
Sauer et al.

[15] 3,655,166
[45] Apr. 11, 1972

[54] PROCESS AND DEVICE FOR CONTINUOUS PREPARATION OF EMULSIONS

[72] Inventors: Theo Sauer; Gunter Schulz, both of Perutz Photowerke ZN der Agfagevaert AG. Kistlerhofstr. 75, D-8000, Munich 25, Germany

[22] Filed: Dec. 21, 1970

[21] Appl. No.: 100,029

[30] Foreign Application Priority Data

Dec. 24, 1969 Germany ..................P 19 64 923.1

[52] U.S. Cl. .................................................259/27, 259/4
[51] Int. Cl. ............................................................B01f 5/18
[58] Field of Search ......................259/4, 7, 8, 18, 19, 21, 22, 259/27, 23, 24, 37, 47, 43, 44; 96/94

[56] References Cited

UNITED STATES PATENTS

| | | | |
|---|---|---|---|
| 2,667,407 | 1/1954 | Fenske | 259/27 |
| 2,681,798 | 6/1954 | Muller | 259/27 |
| 3,074,786 | 1/1963 | Duthie | 259/27 |
| 3,164,443 | 1/1965 | Watson | 259/4 |
| 3,298,669 | 1/1967 | Zingg | 259/4 |

Primary Examiner—Robert W. Jenkins
Attorney—Connolly and Hutz

[57] ABSTRACT

An emulsion such as suspensions containing silver halide is continuously prepared by conducting the basic component upwards in a closed tubular member and sequentially delivering the further components rotationally in a cross-current direction to the rising basic component and resultant mixture at inlet points arranged one after another with respect to the flow direction.

15 Claims, 3 Drawing Figures

Patented April 11, 1972

PROCESS AND DEVICE FOR CONTINUOUS PREPARATION OF EMULSIONS

BACKGROUND OF INVENTION

This invention relates to a process for the continuous preparation of emulsions or the like, particularly suspensions containing silver halide, wherein the components are introduced into a closed tube-like member by means of dosing pumps and are dispersed in each other; and to a device, consisting of a somewhat pipe-shaped member with inlet points, for carrying out the process.

According to the German Published Application 1,000,686, a process for the continuous preparation of photographic emulsions and a device for carrying out this process have already been suggested, wherein the components are introduced into a closed pipe-shaped member by means of dosing pumps are distributed in each other. In this connection, all components are introduced—apparently continuously—at one end of the pipe-shaped member and are distributed in each other by means of a stirrer, so that this pipe-shaped member, together with the stirrer represent the precipitation zone. On the other end of the pipe-shaped member there is a further pipe-shaped member connected as the ripening zone, wherein the mixture prepared in the first pipe-shaped member is brought or drawn off by means of a conveyer screw arranged in the second pipe-shaped member, supported in vertical order by the force of gravity and partially by the pushing of the delivered components.

This process and accordingly the device therefor have considerable disadvantages compared to the advantages of a closed system. With such an arrangement having a considerable diameter for the pipe-shaped member, whether with a horizontal or vertical arrangement, air pockets are unavoidable in the mixture. These air pockets are undesirable and require complicated apparatus for their elimination. By the use of stirring, a movement of the individual particles of the components against each other and an equalization in the total, constantly conveyed mixture should be achieved. In this connection, however, the problems of stirring effects oppose an especially quick distribution and equalization of the mixture, so that in different zones of such a mixture, a very wide straying of the reaction sets in. The use of a very great conveying cross-section necessarily results in a large quantity, which is actually disadvantageous when considering the uncorrectable mixture defects. In addition, special outlays in mixture changing are unavoidable when the device is emptied and cleaned by a follow-up with distilled water or the like. Mixtures with increasing concentrations cannot be prepared, and a control of the mixture is impossible.

SUMMARY OF INVENTION

The object of the invention is to provide a process and device for continuous preparation of emulsions or the like, particularly suspensions containing silver halide, wherein the components are introduced and distributed in each other in a closed, pipe-shaped member by means of dosing pumps. With the process, using the device which is economical in both structure and operation, the preparation of completely uniform, repeatable mixtures is made possible, even such mixtures having increasing concentration. The process also permits a control and if necessary a correction of the corresponding mixtures.

In a process for the continuous preparation of emulsions or the like, particularly of suspensions containing silver halide, after the components have been introduced and dispersed into each other in a closed, pipe-shaped member, the basic component is conducted in a rising current and in sequence the components are rotationally delivered in cross-current to the basic component or to the resulting mixture at inlet points arranged one after the other in the conveying direction. In this manner air or gas bubbles are produced neither by the conveyance per se, nor by the delivery of the components, nor by their distribution in each other. Since no mechanical elements, such as stirrers or the like, need be provided in the pipe-shaped member, the cross-sectional area of the tubular member aperture may be kept relatively small, bringing about further very considerable advantages. These advantages consist of a flow, close to the stopper flow ideally suitable for this purpose, which is also often clearly expressed as "first in - first out." In other words, this means that all the finest droplets of the components or of the mixture simultaneously delivered to the tubular member simultaneously pass and finally leave the tubular member. By delivering the further components at the particular inlet points in cross-current, i.e. perpendicular to the flow direction of the basic component or of the resulting mixture, a substantially complete mixing effect is achieved with the amount to be mixed together becoming constantly relatively smaller. By having the flow very close to an air pressure flow and with the mixing effect achieved by means of cross-current, there results a reaction of the components, uniformly distributed together over the total mixture in proportion of the path to the time.

According to a novel embodiment of the process, at least one component is delivered into a pulsating cross-current, whereby as a result of fine cross-layering, an increase in the mixing effect is achieved.

According to another novel design, at least one of the components is optionally or at the same time delivered into the basic component or into the resulting mixture at one or more inlet points arranged in sequence following each other in the conveying direction, whereby it becomes possible to prepare mixtures with rising concentration and if necessary with the help of further steps acting in a correcting manner in the expiring reaction.

Furthermore, the invention consists in that the cross-current, on account of the delivering of the particular components by means of a dosing pump or the like, is brought about by a circular slot to be opened variably in its rotationally symmetric cross-section. Through this slot the component flows under a relatively high pressure resulting in a particularly penatrative cross-current. Moreover, this step offers the advantage that with the shutting down of the particular inlet point and delivery by way of another delivery point, any lagging of the components and consequently an undesired deterioration of the mixture is avoided.

As a further novel development of the process, it is suggested that for the production of the pulsation of the cross-current before the circular slot closed by the force of the spring pretension, there be built up in the particular component a pressure, which, upon obtaining a certain value, overcomes the force of the spring pretension and by the issuance of the components through the thus-opened circular slot the value is reduced until the circular slot closes by the restoring force of the spring pretension. In this connection, the circular slot is opened and closed in quick succession with corresponding adjustment of the pressure constantly produced by the dosing pump and the force of the spring pretension.

An essential development according to the invention consists, in the preparation of suspensions containing silver halide, of regulating by means of corresponding control devices the amount of the individual components to be delivered to the inlet points and the temperature of a jacket-type heating of the tubular member and/or of a heating device arranged to the tubular member in the conveying direction of the mixture by means of one or several conductivity sensing elements, pAg-sensing elements and/or temperature sensing elements. By using the particular sensing element as the primary element as well as standard sizes preadmitted in the customary manner, final control elements, such as valves or even the dosing pumps, may be activated or adjusted by means of such a control system in a manner in which a constant supervision of the process is not required. The uniformity of the continuously resulting mixture, of the emulsion or of the suspension is consequently also assured.

In a further development of the invention, the resulting mixture is submitted to an additional mixture in the sections of the tubular member situated between the inlet points by means of mixing elements.

A device for the carrying out of the process according to the invention includes for each inlet point in the tubular member, a mixing valve with a circular slot situated in a plane perpendicular to the conveying direction, directed nearly radially, to be opened —variably in its rotationally symmetrical cross-section —by the pressure of the particular component by means of a dosing pump or the like to overcome the spring pretension which urges the valve closed. Moreover, the tubular member is composed of a number of pipe sections with a mixing valve inserted as the inlet point at their points of connection.

According to a novel development, the mixing valve consists of a rotatable valve member having a generally U-shaped cross-section whose outer leg, provided with an inlet opening, also serves as the sleeve or jacket-shaped connection of the subsequent pipe sections and whose inner leg, disposed in the conveying direction, with its inclined annular frontal surface represents a wall of the circular slot. The valve also includes a circular valve disk, springy per se, formed of a flexible material, acted upon by spring pretension due to its deformable mounting for urging the disk against the frontal surface of the valve member or to its edge placed inwards.

According to an alternative novel development, the mixing nozzle valve consists of a valve member connecting two adjacent pipe sections with an opening of approximating the cross-sectional area of aperture of the tubular member or the pipe sections. An annular groove-like recess is arranged in the opening as well as a circular ring canal having an inlet opening connected to this recess in the axial direction, and —in the rest or closed position —a circular ring-shaped valve disk, made of a flexible rubber material fills the annular groove-shaped recess, with the inside diameter corresponds somewhat to the opening of the valve member. In this connection, the inclined circular ring shaped frontal surface situated between the opening and the circular ring canal represents the one wall and the area of the valve disk adjacent to this frontal surface as a result of the spring pretension represents the other wall of the circular slot. The width of the annular groove-shaped recess for example is adjustable in the axial direction, for the purpose of affecting the valve disk with axial pressure intensifying its spring pretension by divided construction of the valve member.

Finally, it is suggested according to the invention that in the tubular member one or several mixing disks, provided with a plurality of nearly concentric borings and situated at right angles to the conveying direction, be mounted on a rod placed in the axis of the tubular member. An oscillator, such as a vibromixer, engages at the rod drawn out with a seal of a rubber membrane or the like, without a gland, preferably at the front end of the tubular body placed counter the conveying direction. The borings in the mixing disks have conical expansion in the conveying direction. In this construction, the mixing disks in an advantageous manner do not require a larger cross-sectional area of aperture of the tubular body but instead, in view of its diameter, may moreover be fitted to the given cross-sectional area of aperture. Due to the conical expansion of the borings in conveying direction, with the mixing disks there is simultaneously achieved a constant, very slight backwash, yet very advantageous for the distribution of the components.

THE DRAWINGS

FIG. 1 schematically shows a unit with a device for the carrying out of the process of this invention;

DETAILED DESCRIPTION

Figure 1:
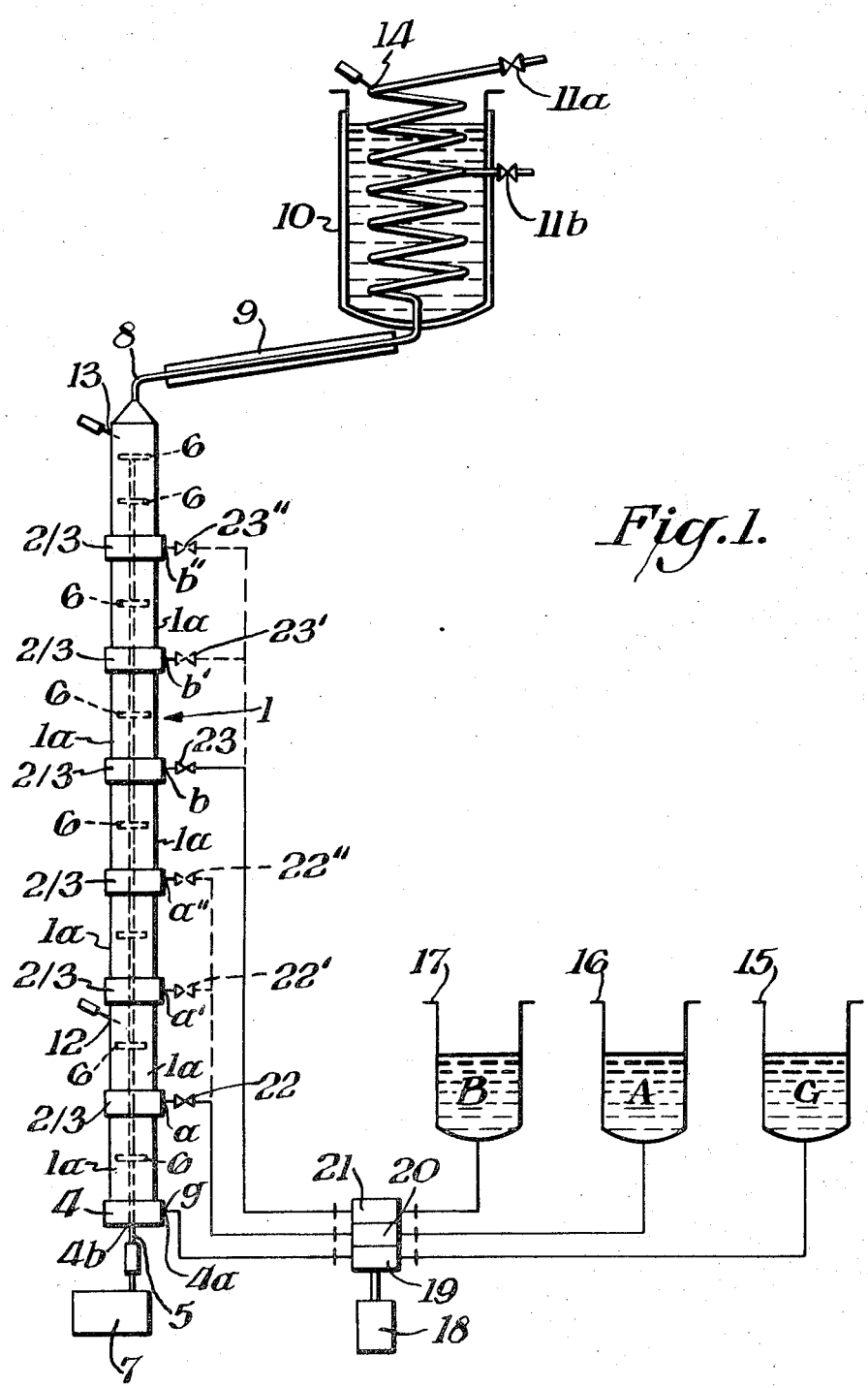

As shown in the drawings, a device for the carrying out of the process for the preparation of emulsions or the like, such as a suspension containing silver halide, consists of a closed, tubular member 1, which is composed of a plurality of pipe sections 1a, at whose connecting points mixing nozzle valves 2 or 3 are arranged. At the lower end the tubular body 1 is closed by a bottom piece 4. The inlet point g, simultaneously contains a supply orifice 4a and —not illustrated in detail —a rubber membrane 4b. The membrane serves as a seal for a rod 5 which carries in the tubular member 1 a mixing disk 6 between two inlet points or mixing nozzle valves 2 or 3. Outside, the tubular member 1 is closed by an oscillator 7 whose oscillating direction is coaxial to the tubular member or body 1. At its upper end, the tubular body 1 is conducted over into a reaction spiral tube 8 which is either provided with a coating 9 or is arranged in a warm water container 10 and has two discharge valves 11a and 11b. In the tubular body 1 is engaged a conductivity sensor 12 as well as a pAg-sensor 13 and in the reaction spiral tube 9 is engaged a temperature sensor 14. To the unit are arranged vessels 15, 16 and 17 wherein are prepared, respectively, a gelatine solution as the basic component G, and a reaction solution such as potassium bromide as a component A, and a reaction solution such as silver nitrate as a further component B. From vessels 15, 16 and 17, pipe lines lead to dosing pumps 19, 20 and 21, coupled together or driven by a common motor 18, and from there to the inlet point g, by way of valves 22, 22' and 22'' to the inlet points a, a' and a'' as well as by way of valves 23, 23' and 23'' to the inlet points b, b' and b''.

Figure 2:
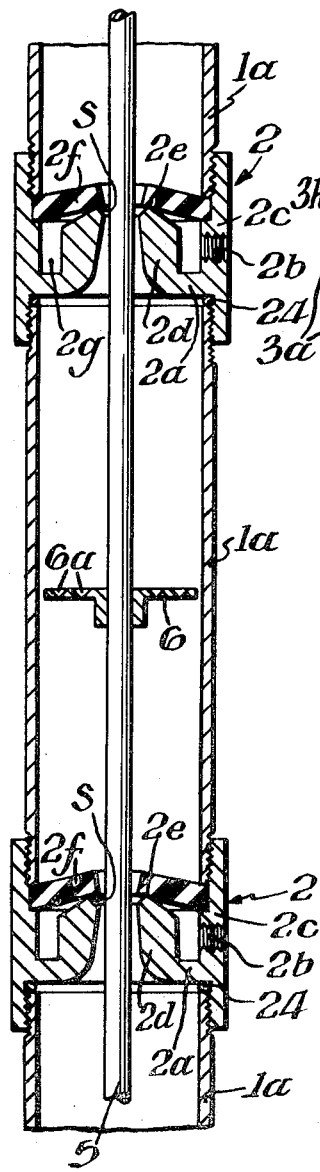
FIG. 2 is a sectional view of a portion of the device of FIG. 1.

According to FIG. 2, the mixing nozzle valve 2 consists of a valve member 2a having a rotating, somewhat U-shaped cross-section, whose outer leg 2c is provided with a supply orifice 2b and simultaneously serves as the sleeve or jacket-shaped connection of the subsequent pipe sections 1a, having a gasket ring 2a inserted therebetween. The inner leg 2d is disposed in the conveying direction, with its inclined; ring-shaped, rotating frontal surface 2e representing one wall of the circular slot S. A circular springy valve disk 2f, formed of a flexible material, is affected by spring pretension due to deformed mounting, and presses against the frontal surface 2e of the valve member 2a or to its edge disposed inwards under the pressure produced by the spring pretension. In this manner, in the valve body 2a, covered by the valve disk 2f, there is formed a ring-shaped canal 2g opening toward the circular slot S.

Figure 3:
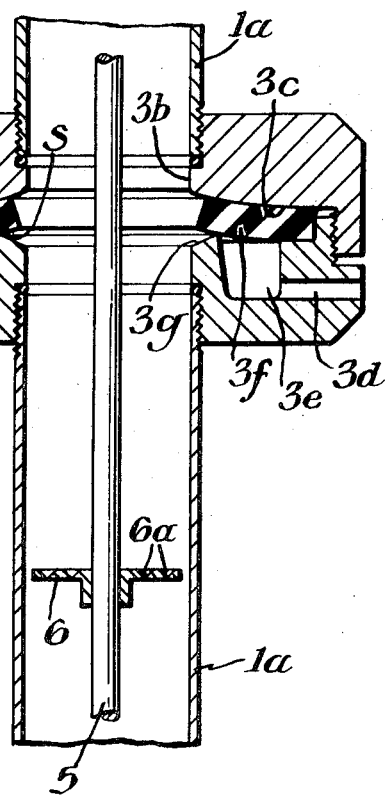
FIG. 3 is an alternative construction of the device in section, similar to FIG. 2.

In the embodiment of FIG. 3, the mixing nozzle valve 3 consists of a valve member 3a, connecting two adjacent pipe sections 1a, with an opening 3b of approximately the cross-sectional area of aperture 3b of the tubular member 1 or of the pipe sections 1a. An annular groove-shaped recess 3c is arranged in the opening 3b, as well as a circular ring canal 3e having an inlet opening 3d communicating with recess 3c. A circular ring-shaped valve disk 3f is made of flexible rubber material and, in the rest position, fills the annular groove-shaped recess 3c. The inside diameter of disk 3f corresponds somewhat to the opening 3b of the valve member 3a. The inclined, circular ring-shaped frontal surface 3g situated between the opening 3b and the circular ring canal 3e represents the one wall and the area of the valve disk 3f adjacent to this frontal surface 3g as a result of the spring pretension represents the other wall of the circular slot S. The width w of the annular groove-shaped recess 3c is adjustable in the axial direction, for the purpose of affecting the valve disk 3f with axial pressure intensifying the spring pretension, by divided construction of the valve member 3a by means of threads 3h, for example.

According to FIGS. 2 and 3, in the mixing disks 6 there are provided a plurality of concentric borings 6a expanded conically in the conveying direction.

It is emphasized that the novel device makes possible with the same apparatus both the preparation of small amounts for laboratory tests as well as large-scale production of emulsions or suspensions according to the novel process, with the hourly output being variable by means of speed change of the entire drive of the dosing pumps. Due to the possibility of utilizing the sensors as primary elements for regulation purposes, the entire production process may be programmed on the basis, as the case may be, of coded recipes fed on data carriers, such as punch cards.

What is claimed is:

1. A process for the continuous preparation of emulsions wherein the components are introduced into a closed tubular member by means of dosing pumps and are dispersed in each other, characterized in conducting the basis component in a rising current, and sequentially delivering the further components rotationally in cross-current to the basic component and resultant mixture at inlet points arranged one after the other with respect to the conveying direction.

2. The process of claim 1 wherein at least one of the further components is delivered in a pulsating cross-current.

3. The process of claim 2 wherein at least one of the further components is delivered into the rising current at multiple points arranged in sequence one above the other.

4. The process of claim 3 wherein the cross-current flow is through a circular slot which opens variably in its rotationally symmetric cross-section by means of the pressure of the particular further component overcoming the spring pretension which otherwise urges the slot to a closed position.

5. The process of claim 4 wherein the pulsating cross-current is accomplished by utilizing a dosing pump for building up the pressure of the particular further component to an amount which is sufficient to overcome the spring pretension to permit a volume of the further component to emerge from the slot, the slot then closing by adjustment of the pressure produced by the dosing pump, and the slot again opening by subsequent pressure build up with the opening and closing taking place in quick succession.

6. The process of claim 4 wherein the emulsions are suspensions containing silver halide, and wherein control devices are utilized for regulating the amount of individual components delivered to the inlet points and the temperature of heating means for the tubular member by means of conductivity sensing elements for actuating the control devices.

7. The process of claim 6 including utilizing mixing elements for providing additional mixing to the rising current between respective inlet points.

8. A device for the continuous preparation of emulsions comprising a substantially tubular member having a plurality of inlet points arranged in a direction of conveyance, a mixing nozzle valve at each of said inlet points, each valve having a circular slot outlet disposed in a plane perpendicular to said direction of conveyance and which is openable generally radially, spring pretension means urging said slot outlet toward a closed position, pressure means for overcoming said spring pretension means for variably opening said slot outlet in a rotationally symmetrical cross-sectional manner, and said pressure means including a pump for forcing a particular component through said slot.

9. The device of claim 8 wherein said tubular member is formed by a plurality of pipe sections interconnected by said mixing nozzle valves.

10. The device of claim 9 wherein each of said mixing nozzle valves comprises a valve body having an annular U-shaped cross-section with an annular hollow inner leg and an annular outer leg, the inlet point for said valve being an inlet opening in said outer leg, said outer leg also acting as a sleeve which receives a respective pipe section, said inner leg being generally disposed in said direction of conveyance, said inner leg terminating in an inclined annular frontal surface, said frontal surface comprising one wall of a circular slot outlet communicatable with the hollow interior of said inner leg, a resilient ring shaped valve disk disposed adjacent said frontal surface and comprising the other wall of said slot outlet, and deformable mounting means creating a spring pretension in said disk to urge said disk against said frontal surface whereby said slot outlet is biassed to a closed position to prevent flow from said inlet opening to said pipe sections.

11. The device of claim 9 wherein each of said mixing nozzle valves comprises a valve body connecting a pair of adjacent hollow pipe sections to each other, its inlet point being an inlet opening in said valve body, said valve body having a flow opening between said pair of pipe sections and of approximately the same cross-sectional area as the cross-sectional open area of said pipe sections, and annular recess in said valve body between said inlet opening and said flow opening, a resilient annular valve disk disposed in and filling said annular recess, said valve disk having an inside diameter of approximately the same size as said flow opening, said valve body having an annular inclined frontal surface adjacent said valve disk, an annular canal in said valve body between said inlet opening and said frontal surface whereby said inlet opening is in flow communication with said flow opening when said valve disk is spaced from said frontal surface, said frontal surface comprising one wall of a circular slot outlet and said valve disk comprising the other wall, and spring pretension means urging said valve disk against said frontal surface.

12 The device of claim 11 including means for adjusting the heighth of said annular recess for controlling the amount of said spring pretension means.

13. The device of claim 12 wherein said valve body comprises a pair of body members having grooves facing each other to form said annular recess, and adjustable connecting means securing said body members together for selective movement toward and away from each other to control said heighth of said recess to comprise said heighth adjusting means.

14. The device of claim 9 wherein mixing means are disposed in said tubular member between the inlet points of at least one pair of said inlet points, said mixing means including a mixing disk disposed substantially perpendicular to said direction of conveyance, a plurality of nearly concentric borings through said mixing disk, a rod disposed along the axis of said tubular member in said direction of conveyance, said mixing disk being mounted on said rod, said rod being connected to said tubular body by a flexible member, and an oscillator connected to said rod.

15. The device of claim 14 wherein said disk borings are conically shaped along said direction of conveyance.

* * * * *